(12) United States Patent
Oka et al.

(10) Patent No.: US 8,983,401 B2
(45) Date of Patent: Mar. 17, 2015

(54) RADIO COMMUNICATION APPARATUS

(75) Inventors: Shinya Oka, Yokosuka (JP); Takashi Okada, Yokohama (JP)

(73) Assignee: NTT DOCOMO, INC., Tokyo (JP)

( * ) Notice: Subject to any disclaimer, the term of this patent is extended or adjusted under 35 U.S.C. 154(b) by 344 days.

(21) Appl. No.: 13/514,327

(22) PCT Filed: Dec. 1, 2010

(86) PCT No.: PCT/JP2010/071449
§ 371 (c)(1),
(2), (4) Date: Jun. 7, 2012

(87) PCT Pub. No.: WO2011/070949
PCT Pub. Date: Jun. 16, 2011

(65) Prior Publication Data
US 2012/0244821 A1      Sep. 27, 2012

(30) Foreign Application Priority Data
Dec. 7, 2009   (JP) ................... 2009-277668

(51) Int. Cl.
*H04B 1/38*    (2006.01)
*H04B 1/18*    (2006.01)
(Continued)

(52) U.S. Cl.
CPC . *H04B 1/50* (2013.01); *H04B 1/005* (2013.01)
USPC ..... 455/73; 455/168.1; 455/180.1; 455/188.1

(58) Field of Classification Search
CPC .................................. H04B 1/005; H04B 1/50
USPC .............. 455/552.1, 553.1, 73, 168.1, 178.1, 455/180.1, 188.1; 375/219
See application file for complete search history.

(56) References Cited

U.S. PATENT DOCUMENTS

| 6,507,728 B1 | 1/2003 | Watanabe et al. |
| 2007/0021080 A1 | 1/2007 | Kuriyama et al. |

(Continued)

FOREIGN PATENT DOCUMENTS

| JP | 2000 49652 | 2/2000 |
| JP | 2007 19939 | 1/2007 |

OTHER PUBLICATIONS

3GPP TR 36.8xx VI1 1.0, "$3^{rd}$ Generation Partnership Project; Technical Specification Group Radio Access Network; Evolved Unoversal Terrestrial Radio Access (E-UTRA); Uplink Multiple Antenna Transmission; Base Station (BS) radio transmission and reception," Total 15 Pages, (Aug. 2010).

(Continued)

*Primary Examiner* — Ping Hsieh
*Assistant Examiner* — Xin Jia
(74) *Attorney, Agent, or Firm* — Oblon, McClelland, Maier & Neustadt, L.L.P.

(57) ABSTRACT

A communication apparatus includes a radio portion (100) configured to transmit a modulated transmission signal and to receive a modulated reception signal. The radio portion (100) includes a transmission and reception antenna (103) configured to transmit the modulated transmission signal and to receive the modulated reception signal; a reception antenna (105) configured to receive the modulated reception signal; a transmission filter (107) interposed between a modulation and demodulation circuit (101) and the transmission and reception antenna (103), and configured to pass the modulated transmission signal; a reception filter (109) interposed between the transmission and reception antenna (103) and the modulation and demodulation circuit (101) and between the reception antenna (105) and the modulation and demodulation circuit (101), and configured to pass the modulated reception signal; a first circulator (111) configured to direct the modulated reception signal from the transmission and reception antenna (103) to the reception filter (109); and a second circulator (113) configured to direct the modulated reception signal from the reception antenna (105) to the reception filter (109).

2 Claims, 2 Drawing Sheets

(51) Int. Cl.
*H04B 1/50* (2006.01)
*H04B 1/00* (2006.01)

(56) References Cited

U.S. PATENT DOCUMENTS

2009/0227214 A1* 9/2009 Georgantas et al. ............ 455/86

2009/0323783 A1* 12/2009 Buris et al. .................... 375/219

OTHER PUBLICATIONS

International Search Report Issued Jan. 11, 2011 in PCT/JP10/71449 Filed Dec. 1, 2010.

* cited by examiner

RADIO COMMUNICATION APPARATUS

TECHNICAL FIELD

The present invention relates to radio communication apparatuses that communicate using frequency division duplexing (FDD) in a radio communication system and, in particular, to radio communication apparatuses that communicate using MIMO (Multiple Input and Multiple Output).

BACKGROUND ART

In FDD communication, different frequencies are used in transmission and reception. For this reason, a radio communication apparatus needs a transmission antenna and a transmission filter which passes a transmission frequency band, and a reception antenna and a reception filter which passes a reception frequency band.

If MIMO, in which plural radio transmission channels and plural radio reception channels are used simultaneously and in parallel, is applied in FDD, the communication apparatus needs the transmission antennas and the transmission filters which pass the transmission frequency band equal to the number of the transmission channels, and the reception antennas and the reception filters which pass the reception frequency band equal to the number of the reception channels.

Therefore, increase of the transmission channels and the reception channels in order to accelerate communication speed requires the antennas and the filters equal to the increased number of the channels. As a result, there is a problem that circuit area for installation of the antennas and the filters increases.

To cope with the problem, for instance, a technique disclosed in Patent Document 1 may be applied. Patent Document 1 discloses a multiband radio communication apparatus that includes plural antennas, plural filters, plural duplexers, a modulation circuit, and a demodulation circuit. Because a duplexer is connected to a transmission circuit and a reception circuit is connected to one antenna, the apparatus is able to execute both transmission and reception using the one antenna. In the above-mentioned manner, the number of the antennas can be reduced.

CITATION LIST

Patent Document

Patent Document 1: Japanese Patent Application Laid-Open Publication No. 2007-19939

SUMMARY OF INVENTION

Technical Problem

However, according to the technique in Patent Document 1, the transmission filters equal to the number of the transmission channels and the reception filters equal to the number of the reception channels are required. As a result, even if the technique stated in this Document is applied to MIMO, there remains a problem that the installation area of the filters cannot be reduced.

Accordingly, the present invention provides a radio communication apparatus which includes a radio communication unit configured to reduce the installation area of the filters.

Solution to Problem

In accordance with an aspect of the present invention, a communication apparatus includes: a modulator configured to modulate a transmission signal with a transmission frequency to generate a modulated transmission signal; a demodulator configured to demodulate a modulated reception signal with a reception frequency different from the transmission frequency to generate a reception signal; and at least one transmission and reception set connected to the modulator and the demodulator, and configured to transmit the modulated transmission signal and to receive the modulated reception signal. The transmission and reception set includes: a transmission and reception antenna configured to transmit the modulated transmission signal and to receive the modulated reception signal; a reception antenna configured to receive the modulated reception signal; a transmission filter interposed between the modulator and the transmission and reception antenna, and configured to pass the modulated transmission signal generated by the modulator; a reception filter interposed between the transmission and reception antenna and the demodulator and between the reception antenna and the demodulator, and configured to pass the modulated reception signal received at the transmission and reception antenna and the reception antenna; a first circulator configured to direct the modulated reception signal received at the transmission and reception antenna to the reception filter; and a second circulator configured to direct the modulated reception signal received at the reception antenna to the reception filter.

In the configuration, since the one reception filter can be shared with the signal received at the transmission and reception antenna and the signal received at the reception antenna, the reception filter may not be required with respect to each antenna to receive. As a result, the number of the reception filters can be reduced.

Preferably, the first circulator is configured to direct the modulated reception signal to the demodulator, the modulated reception signal having passed through the reception filter from the reception antenna via the second circulator, and the second circulator is configured to direct the modulated reception signal to the demodulator, the modulated reception signal having passed through the reception filter from the transmission and reception antenna via the first circulator.

In the configuration, the first circulator directs not only the modulated reception signal received at the transmission and reception antenna to the reception filter, but the modulated reception signal which has passed through the reception filter from the reception antenna via the second circulator to the demodulator. The second circulator directs not only the modulated reception signal received at the reception antenna to the reception filter, the modulated reception signal which has passed through the reception filter from the transmission and reception antenna via the first circulator to the demodulator. That is, each circulator can be used for two purposes. As a result, in comparison to cases in which respective wires are set up, the number of wires can be reduced.

Preferably, the radio communication apparatus according to the present invention includes plural transmission and reception sets.

In the configuration, if the number of the transmission and reception sets of the radio communication apparatus increases and thus the number of the antennas to receive increases, the number of the reception filters can be reduced up to half the number of the antennas to receive.

Preferably, the modulator is configured to generate a first modulated transmission signal by modulating a transmission signal with a first transmission frequency and to generate a second modulated transmission signal by modulating a transmission signal with a second transmission frequency, the demodulator is configured to generate a reception signal by demodulating a modulated reception signal with a first reception frequency different from the first transmission frequency and to generate a reception signal by demodulating a modulated reception signal with a second reception frequency different from the second transmission frequency, the transmission and reception antenna is configured to transmit the first modulated transmission signal and the second modulated transmission signal generated by the modulator, the transmission and reception antenna is configured to receive the modulated reception signal modulated with the first reception frequency and the modulated reception signal modulated with the second reception frequency, the reception antenna is configured to receive the modulated reception signal modulated with the first reception frequency and the modulated reception signal modulated with the second reception frequency, the transmission filter comprises a first transmission filter configured to pass the first modulated transmission signal and a second transmission filter configured to pass the second modulated transmission signal, and the reception filter comprises a first reception filter configured to pass the modulated reception signal modulated by the first reception frequency and a second reception filter configured to pass the modulated reception signal modulated by the second reception frequency. Preferably, the radio communication apparatus includes: a transmission switching unit configured to activate any of the first transmission filter and the second transmission filter depending on whether the first transmission frequency or the second transmission frequency is used in transmission; and a reception switching unit configured to activate any of the first reception filter and the second reception filter depending on whether the first reception frequency or the second reception frequency is used in reception.

In the configuration, addition of the filters and the switching units can enable communication using plural transmission frequencies and plural reception frequencies, without extra transmission and reception sets for each of the plural transmission frequencies and the plural reception frequencies. As a result, increase of circuit area can be reduced and a circuit structure can be simplified.

DESCRIPTION OF EMBODIMENTS

Reference is made to figures to illustrate the embodiments of the present invention. The following embodiments are not limited to, but are applicable to a radio communication system using SC-FDMA (Single Carrier Frequency Division Multiple Access) for uplink communication and OFDMA (Orthogonal Frequency Division Multiple Access) for downlink communication.

First Embodiment

A mobile station able to execute MIMO according to a first embodiment of the present invention will be described.

Figure 1:
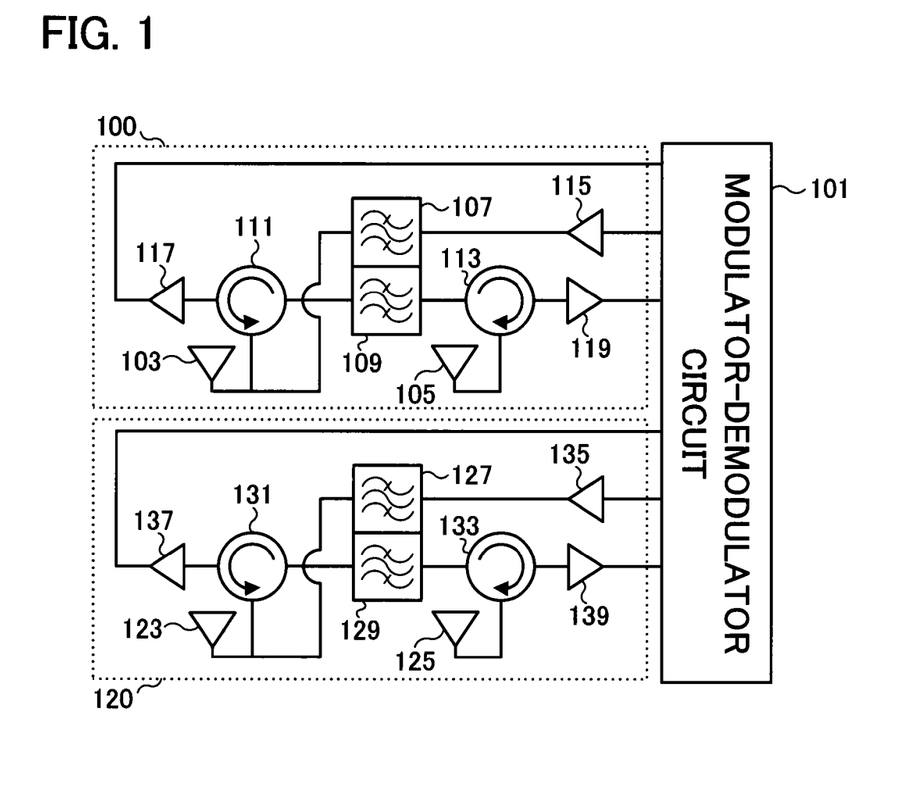
FIG. 1 shows an example of a radio communication unit and a modulator-demodulator unit of a mobile station according to a first embodiment of the present invention.

FIG. 1 shows a mobile station according to the first embodiment of the present invention. The mobile station includes radio communication units (transmission and reception sets) 100, 120 and a modulator-demodulator circuit 101. The radio communication unit 100 includes a transmission and reception antenna 103, a reception antenna 105, a transmission filter 107, a reception filter 109, a first circulator 111, a second circulator 113, an amplifier 115, an amplifier 117, and an amplifier 119. The radio communication unit 100 is connected to the modulator-demodulator circuit 101.

A configuration of the radio communication unit 120 is equivalent to the configuration of the radio communication unit 100. Specifically, the radio communication unit 120 includes a transmission and reception antenna 123, a reception antenna 125, a transmission filter 127, a reception filter 129, a first circulator 131, a second circulator 133, an amplifier 135, an amplifier 137, and amplifier 139. The radio communication unit 120 is connected to modulator-demodulator circuit 101.

The modulator-demodulator circuit 101 includes a modulator and a demodulator, which are not shown in FIG. 1.

The transmission and reception antenna 103 of the radio communication unit 100 transmits a modulated transmission signal and receives a downlink modulated reception signal. The reception antenna 105 receives a downlink modulated reception signal. The transmission filter 107 is a band-limiting filter that passes an uplink frequency. The reception filter 109 is a band-limiting filter that passes a downlink frequency. Each of the first circulator 111 and the second circulator 113 is a three-port circulator which includes three input-output ports.

The transmission and reception antenna 123 of the radio communication unit 120 transmits an uplink modulated transmission signal and receives a downlink modulated reception signal. The reception antenna 125 receives a downlink modulated reception signal. The transmission filter 127 is a band-limiting filter which passes the uplink frequency. The reception filter 129 is a band-limiting filter which passes the downlink frequency. Each of the first circulator 131 and the second circulator 133 is a three-port circulator which includes three input-output ports.

Next, a transmission process of the uplink modulated transmission signal will be described.

The modulator of the modulator-demodulator circuit 101 modulates two different series of the uplink transmission signals with the same uplink frequency to generate two series of the uplink modulated transmission signals. One of the generated two series of the uplink modulated transmission signals is directed to the amplifier 115 of the radio communication unit 100 to be amplified. Subsequently, the one of the series is directed to the transmission filter 107, passes through the transmission filter 107, and reaches the transmission and reception antenna 103.

The other one of the series of the uplink modulated transmission signals generated by the modulator of the modulator-demodulator circuit 101 is directed to the amplifier 135 of the radio communication unit 120 to be amplified. Subsequently, the one of the series is directed to the transmission filter 127, passes through the transmission filter 127, and reaches the transmission and reception antenna 123.

These two series of the uplink modulated transmission signals are transmitted simultaneously and in parallel from the transmission and reception antenna 103 and the transmission and reception antenna 123 to the base station. The two transmitted series of the uplink modulated transmission signals are spatially multiplexed and received at four reception antennas belonging to the base station, which is not illustrated in the figures.

Next, a reception process of the downlink modulated reception signal will be described.

Four different series of the downlink modulated reception signals are transmitted simultaneously from four transmission antennas belonging to the base station, which is not illustrated in the figures, at the same downlink frequency different from the uplink frequency, and spatially multiplexed.

The spatially multiplexed downlink modulated reception signals are received at the transmission and reception antenna 103 of the radio communication unit 100. The downlink modulated reception signals received at the transmission and reception antenna 103 are directed to the reception filter 109 by the first circulator 111, pass through the reception filter 109, and are directed to the second circulator 113. Subsequently, the downlink modulated reception signals are directed to the amplifier 119 by the second circulator 113 to be amplified, and directed to the demodulator of the modulator-demodulator circuit 101.

The spatially multiplexed downlink modulated reception signals are received at the reception antenna 105 of the radio communication unit 100. The downlink modulated reception signals received at the reception antenna 105 are directed to the reception filter 109 by the second circulator 113, pass through the reception filter 109, and are directed to the first circulator 111. Subsequently, the downlink modulated reception signals are directed to the amplifier 117 by the first circulator 111 to be amplified, and directed to the demodulator of the modulator-demodulator circuit 101.

Similarly, in the radio communication 120, the downlink modulated reception signals received at the transmission and reception antenna 123 and the downlink modulated reception signals received at the reception antenna 125 are directed to the demodulator of the modulator-demodulator circuit 101.

The downlink modulated reception signal transmitted from any one of the four transmission antennas belonging to the base station is received in a spatially multiplexed condition at all of the four reception antennas (i.e., the antennas 103, 105 of the radio communication unit 100 and the antennas 123, 125 of the radio communication unit 120) of the mobile station. In other words, each reception antenna of the mobile station receives the downlink modulated reception signals transmitted from the four transmission antennas of the base station and spatially multiplexed.

The spatially multiplexed downlink modulated reception signals received at each of the four reception antennas of the mobile station are respectively directed to the demodulator of the modulator-demodulator circuit 101 via the radio communication unit 100 or the radio communication unit 120 corresponding to the antenna having received the downlink modulated reception signals.

Each of the spatially multiplexed downlink modulated reception signals received at the four reception antennas (i.e., the antennas 103, 105 of the radio communication unit 100 and the antennas 123, 125 of the radio communication unit 120) has gone through one of the propagation paths, each of which has different propagation characteristics. As a result, each of the signals experiences different fading. Thus, the demodulator of the modulator-demodulator circuit 101 is able to obtain a channel matrix that contains characteristic values of plural propagation paths from the base station to the mobile station based on each of the spatially multiplexed downlink modulated reception signals. The demodulator of the modulator-demodulator circuit 101 multiplies the spatially multiplexed downlink modulated reception signals by an inversion matrix of the channel matrix to obtain the four series of the downlink modulated reception signals before spatial multiplexing. Subsequently, the demodulator of the modulator-demodulator circuit 101 demodulates the four series of the downlink modulated reception signals with the downlink frequency to generate four series of downlink reception signals.

As described above, according to the first embodiment, the first circulator 111 directs the downlink modulated reception signal received at the transmission and reception antenna 103 to the reception filter 109, and the second circulator 113 directs the downlink modulated reception signal received at the reception antenna 105 to the same reception filter 109. The same applies to the first circulator 131, the transmission and reception antenna 123, the reception filter 129, the second circulator 133, and the reception antenna 125. That is, downlink modulated reception signals received at separate antennas pass through one reception filter, so that a reception filter is not necessary for every antenna to receive. As a result, circuit area corresponding to one reception filter can be reduced per one radio communication unit including two antennas to receive.

In the first embodiment described above, the first circulator 111 directs the downlink modulated reception signal to the demodulator of the modulator-demodulator circuit 101, the downlink modulated reception signal having passed the reception filter 109 from the reception antenna 105 via the second circulator 113. The same applies to the first circulator 131, the reception filter 129, the reception antenna 125, and the second circulator 133. The second circulator 113 directs the downlink demodulated reception signal to the demodulator of the modulator-demodulator circuit 101, the downlink modulated reception signal having passed through the reception filter 109 from the transmission and reception antenna 103 via the first circulator 111. The same applies to the second circulator 133, the reception filter 129, the transmission and reception antenna 123, and the first circulator 131. As described above, each circulator is used for two purposes. As a result, in comparison to cases in which respective wires are set up, the number of wires in the circuit can be preferably reduced.

Modification of the First Embodiment

However, the present invention is not limited the above-described embodiment. The downlink modulated reception signal may be directed to the demodulator of the modulator-demodulator circuit without passing through the first circulator, the downlink modulated reception signal having passed through the reception filter from the reception antenna via the second circulator. The downlink demodulated reception signal may be directed to the demodulator of the modulator-demodulator circuit without passing through the second circulator, the downlink modulated reception signal having passed through the reception filter from the transmission and reception antenna via the first circulator.

In the above-described first embodiment, the radio communication unit 100 includes the amplifier 117 which is interposed between the first circulator and the modulator-demodulator circuit 101 and which amplifies the downlink modulated reception signal, and the amplifier 119 which is interposed between the second circulator and the modulator-demodulator circuit 101 and which amplifies the downlink modulated reception signal. The present invention is not limited to the above-described embodiment. The modulator-demodulator 101 may include such amplifiers. Similarly, the radio communication unit 120 includes the amplifier 137 which is interposed between the first circulator and the modulator-demodulator circuit 101 and which amplifies the downlink modulated reception signal, and the amplifier 139 which is interposed between the second circulator and the modulator-demodulator circuit 101 and which amplifies the downlink modulated reception signal. The present invention is not limited to the above-described embodiment. The modulator-demodulator 101 may include such amplifiers.

The above-described first embodiment is applied to MIMO according to Space Division Multiplexing (SDM) in which every antenna transmits a different signal. The present invention is not limited to the above-described embodiment. For example, the embodiment may be applied to MIMO according to Eigenbeam-Space Division Multiplexing (E-SDM) in which a different signal is sent through every transmission beam, or other MIMO.

The above-described first embodiment is applied to 2×4 mobile station transmission MIMO in which the mobile station uses the two transmission antennas and the base station uses the four reception antennas, and to 4×4 mobile station reception MIMO in which the base station uses the four transmission antennas and the mobile station uses the four reception antennas. The present invention is not limited to the above-described embodiment. The embodiment may be applied to MIMO according to a different antenna configuration, for example, 2×2 mobile station transmission MIMO in which the mobile station uses the two transmission antennas and the base station uses the two transmission antennas.

In the above-described first embodiment, the one modulator-demodulator circuit includes the modulator and the demodulator. The present invention is not limited to the above-described embodiment. The modulator and the demodulator may be separately installed in the mobile station.

In the above-described first embodiment, the two radio communication units are installed. The present invention is not limited to the above-described embodiment. Only one radio communication unit or more than two radio communication units may be installed.

Second Embodiment

Next, a mobile station able to execute MIMO according to a second embodiment of the present invention will be described.

Figure 2:
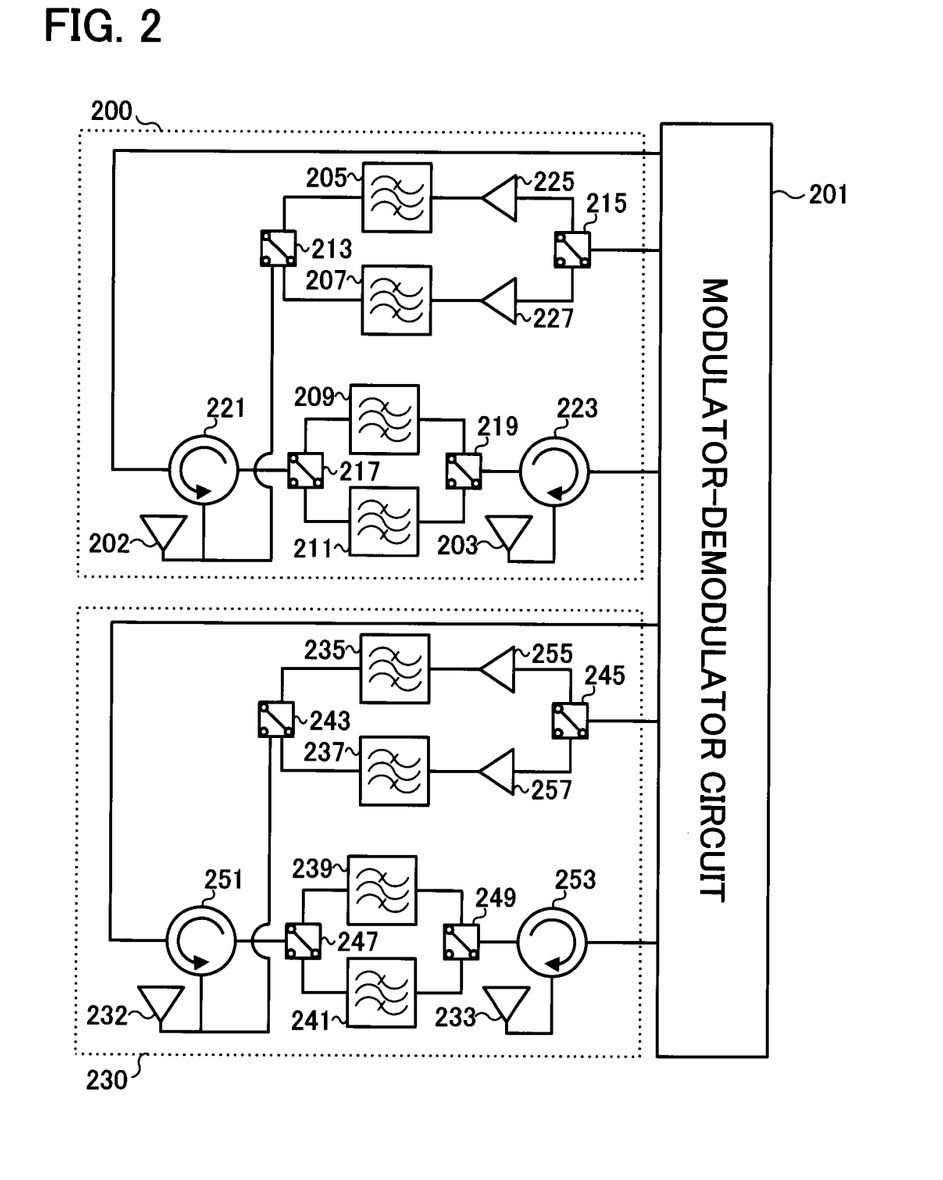
FIG. 2 shows an example of a radio communication unit and a modulator-demodulator unit of a mobile station according to a second embodiment of the present invention.

FIG. 2 shows a mobile station according to the second embodiment of the present invention. The mobile station includes radio communication units (transmission and reception sets) 200, 230 and a modulator-demodulator circuit 201. The radio communication unit 200 includes a transmission and reception antenna 202, a reception antenna 203, a first transmission filter 205, a second transmission filter 207, a first reception filter 209, a second reception filter 211, transmission switches 213, 215, reception switches 217, 219, a first circulator 221, a second circulator 223, and amplifiers 225, 227. The radio communication unit 200 is connected to the modulator-demodulator circuit 201.

A configuration of the radio communication unit 230 is equivalent to the configuration of the radio communication unit 200. The radio communication unit 230 includes a transmission and reception antenna 232, a reception antenna 233, a first transmission filter 235, a second transmission filter 237, a first reception filter 239, a second reception filter 241, transmission switches 243, 245, reception switches 247, 249, a first circulator 251, a second circulator 253, and amplifiers 255, 257. The radio communication unit 200 is connected to the modulator-demodulator circuit 201.

The modulator-demodulator circuit 201 includes a modulator and a demodulator, which are not shown in FIG. 2.

The transmission and reception antenna 202 of the radio communication unit 200 transmits first and second uplink modulated transmission signals and receives first and second downlink modulated reception signals. The reception antenna 203 receives first and second downlink modulated reception signals. The first transmission filter 205 is a band-limiting filter which passes first uplink frequency. The second transmission filter 207 is a band-limiting filter which passes second uplink frequency. The first reception filter 209 is a band-limiting filter that passes the first downlink frequency. The second reception filter 211 is a band-limiting filter that passes the second downlink frequency. Each of the first circulator 221 and the second circulator 223 is a three-port circulator which includes three input-output ports.

The transmission and reception antenna 232 of the radio communication unit 230 transmits first and second uplink modulated transmission signals and receives first and second downlink modulated reception signals. The reception antenna 233 receives first and second downlink modulated reception signals. The first transmission filter 235 is a band-limiting filter which passes the first uplink frequency. The second transmission filter 237 is a band-limiting filter which passes the second uplink frequency. The first reception filter 239 is a band-limiting filter which passes the first downlink frequency. The second reception filter 241 is a band-limiting filter which passes the second downlink frequency. Each of the first circulator 251 and the second circulator 253 is a three-port circulator which includes three input-output ports.

The first uplink frequency, the second uplink frequency, the first downlink frequency, and the second downlink frequency are different from each other.

Next, a transmission process of the uplink modulated transmission signal will be described. First, a case in which the first uplink frequency is used will be described.

The modulator of the modulator-demodulator circuit 201 modulates two different series of the uplink transmission signals with the first uplink frequency to generate two series of the first uplink modulated transmission signals. In accordance with application of the first uplink frequency in uplink transmission, the transmission switch 215 directs one of the generated series of the first uplink modulated transmission signals to the amplifier 225 to be amplified. Subsequently, the one of the series is directed to the first transmission filter 205 passing the first uplink frequency, passes through the first transmission filter 205, and reaches the transmission and reception antenna 202 directed by the transmission switch 213.

The other one of the series of the first uplink modulated transmission signals generated by the modulator of the modulator-demodulator circuit 201 is directed to the transmission switch 245. In accordance with application of the first uplink frequency in uplink transmission, the transmission switch 245 directs the other one of the generated series of the first uplink modulated transmission signals to the amplifier 255 to be amplified. Subsequently, the other one of the series is directed to the first transmission filter 235 passing the first uplink frequency, passes the first transmission filter 235, and reaches the transmission and reception antenna 232 directed by the transmission switch 243.

These two series of the first uplink modulated transmission signals are transmitted simultaneously and in parallel from the transmission and reception antenna 202 and the transmission and reception antenna 232 to the base station. The two transmitted series of the first uplink modulated transmission signals are spatially multiplexed and received at four reception antennas belonging to the base station, which is not illustrated in the figures.

Next, a case in which the second uplink frequency is used will be described. The case is basically equivalent to the transmission process in which the first uplink frequency is used. A different point is that each transmission switch directs the second uplink modulated transmission signals to be transmitted to each second transmission filter in accordance with application of the second uplink frequency.

A reception process of the downlink modulated reception signal will be described. First, a case in which the first downlink frequency is used will be described.

Four different series of the downlink modulated reception signals are transmitted simultaneously from four transmission antennas belonging to the base station, which is not illustrated in the figures, at the first downlink frequency, and spatially multiplexed.

The first downlink modulated reception signals modulated with the first downlink frequency are received at the transmission and reception antenna 202 of the radio communication unit 200. The first downlink modulated reception signals received at the transmission and reception antenna 202 are directed to the reception switch 217 by the first circulator 221. In accordance with application of the first downlink frequency in downlink reception, the reception switch 217 directs the received first downlink modulated reception signals to the first reception filter 209 which passes the first downlink frequency. After passing the first reception filter 209, the first downlink modulated reception signals are directed reception switch 219. The reception switch 219 directs the first downlink modulated reception signals to the second circulator 223. The first downlink modulated reception signals are directed to the demodulator of the modulator-demodulator circuit 201 by the second circulator 223. The modulator-demodulator circuit 201 includes an amplifier which amplifies the first downlink modulated reception signals and which is not shown in the FIG. 2. Alternatively, such an amplifier may be installed in the radio communication unit 200.

The first downlink modulated reception signals modulated with the first downlink frequency are received at the reception antenna 203 of the radio communication unit 200. The first downlink modulated reception signals received at the reception antenna 203 are directed to the reception switch 219 by the second circulator 223. In accordance with application of the first downlink frequency in downlink reception, reception switch 219 directs the received first downlink modulated reception signals to the first reception filter 209 which passes the first downlink frequency. After passing the first reception filter 209, the first downlink modulated reception signals are directed to the reception switch 217. The reception switch 217 directs the first downlink modulated reception signals to the first circulator 221. The first downlink modulated reception signals are directed to the demodulator of the modulator-demodulator circuit 201 by the first circulator 221. The modulator-demodulator circuit 201 includes an amplifier which amplifies the first downlink modulated reception signals and which is not shown in the FIG. 2. Alternatively, such an amplifier may be installed in the radio communication unit 200.

Similarly, in the radio communication unit 230, the first downlink modulated reception signals received at the transmission and reception antenna 232 and the first downlink modulated reception signals received at the reception antenna 233 are directed to the modulator of the modulator-demodulator circuit 201. The modulator-demodulator circuit 201 includes amplifiers which amplify the first downlink modulated reception signals and which are not shown in the FIG. 2. Alternatively, such an amplifier may be installed in the radio communication unit 230.

The first downlink modulated reception signal transmitted at the first downlink frequency from any one of the four transmission antennas belonging to the base station is received in a spatially multiplexed condition at all of the four reception antennas (i.e., the antennas 202, 203 of the radio communication unit 200 and the antennas 232, 233 of the radio communication unit 230) of the mobile station. In other words, each reception antenna of the mobile station receives the first downlink modulated reception signals transmitted at the first downlink frequency from the four transmission antennas of the base station and spatially multiplexed.

The spatially multiplexed first downlink modulated reception signals received at each of the four reception antennas of the mobile station are respectively directed to the demodulator of the modulator-demodulator circuit 201 via the radio communication unit 200 or the radio communication unit 230 corresponding to the antenna having received the downlink modulated reception signals.

Each of the spatially multiplexed first downlink modulated reception signals received at the four reception antennas (i.e., the antennas 202, 203 of the radio communication unit 200 and the antennas 232, 233 of the radio communication unit 230) has gone through one of propagation paths, each of which has different propagation characteristics. As a result, each of the signals experiences different fading. Thus, the demodulator of the modulator-demodulator circuit 201 is able to obtain a channel matrix that contains characteristic values of plural propagation paths from the base station to the mobile station based on each of the spatially multiplexed first downlink modulated reception signals. The demodulator of the modulator-demodulator circuit 201 multiplies the spatially multiplexed first downlink modulated reception signals by an inversion matrix of the channel matrix to obtain the four series of the first downlink modulated reception signals before spatial multiplexing. Subsequently, the demodulator of the modulator-demodulator circuit 201 demodulates the four series of the first downlink modulated reception signals with the first downlink frequency to generate four series of downlink reception signals.

Next, a reception process in which the second downlink frequency is used will be described. The process is basically equivalent to the case in which the first downlink frequency is used. A different point is that each reception switch directs the received second downlink modulated reception signals to each second reception filter in accordance with application of the second downlink frequency.

As described above, according to the second embodiment, one radio communication unit corresponds to the first and second uplink frequencies and the transmission switch directs the transmission signal to the transmission filter having a frequency characteristic in which the signal should pass. One radio communication unit corresponds to the first and second downlink frequencies and the reception switch directs the reception signal to the filter having a frequency characteristic in which the signal should pass. As a result, one radio communication unit can execute signal transmission with the first and second uplink frequencies and signal reception with the first and second downlink frequencies. Therefore, in comparison to the configuration that radio communication units are installed for each frequency, increase of radio communication unit area can be reduced and a circuit structure can be simplified.

Modification of the Second Embodiment

All of the modifications in the first embodiment are applicable to the above-described second embodiment.

In the above-described second embodiment, each of the two frequencies (the first uplink frequency and the second uplink frequency) is used as the uplink frequency. The present invention is not limited to the above-described embodiment. More than two uplink frequencies may be used. The same applies to the downlink frequencies.

In the above-described second embodiment, each radio communication unit includes the two pairs of the transmission switches, and the two transmission filters each of which has a different frequency characteristic are arranged in parallel between each pair of the transmission switches. The present invention is not limited to the above-described embodiment. Instead of each pair of the transmission switches, only one of the pair of the transmission switches can be included. For example, while the radio communication unit 200 in FIG. 2 includes the transmission switches 213, 215, the communication unit 200 may include only the transmission switch 213 and the transmission switch 215 may be replaced by wires. Otherwise, the communication unit 200 may include only the transmission switch 215 and the transmission switch 213 may be replaced by wires. The same applies to the reception switches and the reception filters.

Third Embodiment (Application to the Base Station)

The above-described first and second embodiments are applied to the MIMO-adapted mobile station which transmits the modulated transmission signals to the base station at at least one uplink frequency and receives the modulated reception signals from the base station at at least one downlink frequency. The present invention is not limited to the above-described embodiments. For example, the embodiments may be applied to a MIMO-adapted base station which transmits modulated transmission signals to plural mobile stations at at least one downlink frequency and receives modulated reception signals from the plural mobile stations at at least one uplink frequency. Such application can be realized by modification to the first and second embodiments that the term "mobile station" and the term "base station" are exchanged with each other and the word "uplink" and the word "downlink" are exchanged with each other.

Similar to the first and second embodiments, the third embodiment is not limited to, but is applicable to a radio communication system using SC-FDMA for uplink communication and OFDMA for uplink communication.

A configuration of the base station, a transmission process, and a reception process according to the third embodiment are equivalent to the MIMO-adapted mobile station and its processes according to the first embodiment. Only a generation process of the modulated transmission signals executed by the modulator-demodulator circuit 101 in the transmission process and a generation process of the modulated reception signals executed by the modulator-demodulator circuit 101 in the reception process are different from the first embodiment. Accordingly, the different points will be described below.

The transmission process of the downlink modulated signals from the base station will be described.

The modulator of the modulator-demodulator circuit 101 modulates two different series of the downlink transmission signals which represent transmission data for plural users with the same downlink frequency to generate two series of the downlink OFDMA modulated transmission signals.

One of the generated two series of the downlink modulated transmission signals is directed to the amplifier 115 of the radio communication unit 100 and the other one of the generated two series of the downlink modulated transmission signals is directed to the amplifier 135 of the radio communication unit 120. A process after that the generated two series of the downlink modulated signals are respectively directed to the amplifier 115 and the amplifier 135 is equivalent to the transmission process of the first embodiment.

Next, the reception process of the uplink modulated reception signals at the base station will be described.

Uplink SC-FDMA modulated reception signals are transmitted from each of four transmission antennas belonging to every mobile station, which is not illustrated, and spatially multiplexed. The transmission and reception antennas 103, 123 and the reception antennas 105, 125 receive the transmitted and spatially-multiplexed signals. A subsequent process that the uplink modulated reception signals are directed to a demodulator via reception filters is equivalent to the reception process of the first embodiment.

The demodulator of the modulator-demodulator circuit 201 obtains the uplink SC-FDMA modulated reception signals before spatial multiplexing based on the spatially multiplexed uplink SC-FDMA modulated reception signals. Subsequently, the demodulator of the modulator-demodulator circuit 201 demodulates the uplink modulated reception signals corresponding to respective mobile stations to generate uplink reception signals.

The configuration of the base station, the transmission process, and the reception process according to the third embodiment may be equivalent to the MIMO-adapted mobile station and its processes according to the second embodiment. Only a generation process of the modulated transmission signals executed by the modulator-demodulator circuit 201 in the transmission process and a generation process of the modulated reception signals executed by the modulator-demodulator circuit 201 in the reception process are different from the second embodiment in analogy with the above-described base station based on the first embodiment.

As described above, according to the third embodiment, the same effect achieved based on the first and second embodiments can be achieved in the base station.

In the above-described third embodiment, all of the modifications of the first and second embodiments are applicable when the term "mobile station" and the term "base station" are exchanged with each other and the word "uplink" and the word "downlink" are exchanged with each other.

DESCRIPTION OF REFERENCE NUMERALS

100, 120 . . . radio communication unit (transmission and reception set)
101 . . . modulator-demodulator circuit (modulator, demodulator)
103, 123 . . . transmission and reception antenna
105, 125 . . . reception antenna
107, 127 . . . transmission filter
109, 129 . . . reception filter
111, 131 . . . first circulator
113, 133 . . . second circulator
200, 230 . . . radio communication unit (transmission and reception set)
201 . . . modulator-demodulator circuit (modulator, demodulator)
202, 232 . . . transmission and reception antenna
203, 233 . . . reception antenna
205, 235 . . . first transmission filter
207, 237 . . . second transmission filter
209, 239 . . . first reception filter
211, 241 . . . second reception filter
221, 251 . . . first circulator
223, 253 . . . second circulator

The invention claimed is:
1. A radio communication apparatus comprising:
a modulator configured to modulate a transmission signal with a transmission frequency to generate a modulated transmission signal;
a demodulator configured to demodulate a modulated reception signal with a reception frequency different from the transmission frequency to generate a reception signal; and at least one transmission and reception set connected to the modulator and the demodulator, and configured to transmit the modulated transmission signal and to receive first and second modulated reception signals, the transmission and reception set comprising:
- a transmission and reception antenna configured to transmit the modulated transmission signal and to receive the first modulated reception signal;
- a reception antenna configured to receive the second modulated reception signal;
- a transmission filter interposed between the modulator and the transmission and reception antenna, and configured to pass the modulated transmission signal generated by the modulator;
- a reception filter interposed between the transmission and reception antenna and the demodulator and between the reception antenna and the demodulator, and configured to pass the first modulated reception signal received at the transmission and reception antenna and to pass the second modulated reception signal received at the reception antenna;
- a first circulator configured to direct the first modulated reception signal received at the transmission and reception antenna to the reception filter; and
- a second circulator configured to direct the second modulated reception signal received at the reception antenna to the reception filter, wherein
- the first circulator is configured to receive the second modulated reception signal passed by the reception filter and to direct the second modulated reception signal passed by the reception filter to the demodulator, and
- the second circulator is configured to receive the first modulated reception signal passed by the reception filter and to direct the first modulated reception signal passed by the reception filter to the demodulator.

2. A radio communication apparatus comprising:

a modulator configured to generate a first modulated transmission signal by modulating a first transmission signal with a first transmission frequency and to generate a second modulated transmission signal by modulating a second transmission signal with a second transmission frequency;

a demodulator configured to generate a first reception signal by demodulating a first modulated reception signal with a first reception frequency different from the first transmission frequency and to generate a second reception signal by demodulating a second modulated reception signal with a second reception frequency different from the second transmission frequency;

at least one transmission and reception set connected to the modulator and the demodulator, and configured to transmit the first modulated transmission signal and the second modulated transmission signal and to receive the first modulated reception signal and the second modulated reception signal, the transmission and reception set comprising:
- a transmission and reception antenna configured to transmit the first modulated transmission signal and the second modulated transmission signal generated by the modulator, and to receive the first modulated reception signal modulated with the first reception frequency and the second modulated reception signal modulated with the second reception frequency;
- a reception antenna configured to receive the first modulated reception signal and the second modulated reception signal;
- a first transmission filter interposed between the modulator and the transmission and reception antenna, and configured to pass the first modulated transmission signal generated by the modulator;
- a second transmission filter interposed between the modulator and the transmission and reception antenna, and configured to pass the second modulated transmission signal generated by the modulator;
- a first reception filter interposed between the transmission and reception antenna and the demodulator and between the reception antenna and the demodulator, and configured to pass the first modulated reception signal modulated by the first reception frequency;
- a second reception filter interposed between the transmission and reception antenna and reception antenna and the demodulator and between the reception antenna and the demodulator, and configured to pass the second modulated reception signal modulated by the second reception frequency,
- a first circulator configured to direct the first modulated reception signal received at the transmission and reception antenna to the first reception filter; and
- a second circulator configured to direct the second modulated reception signal received at the reception antenna to the second reception filter;
- a transmission switch configured to activate any of the first transmission filter and the second transmission filter depending on whether the first transmission frequency or the second transmission frequency is used in transmission; and
- a reception switch configured to activate any of the first reception filter and the second reception filter depending on whether the first reception frequency or the second reception frequency is used in reception.

* * * * *